Patented June 10, 1930

1,762,542

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

APPARATUS FOR FORMING SPOKE HOLES IN WIRE-WHEEL RIMS

Application filed April 25, 1927. Serial No. 186,458.

The invention relates to an apparatus for forming spoke holes in the rims of wire wheels and has for some of its objects the provision of an improved apparatus for supporting and piercing the rim; the provision of adjustable means for controlling the piercing of the rim; and the provision of means for holding the rim in its correct positions of rotative adjustment. Another object is to so construct the apparatus that it may be used to pierce a continuous tire carrying rim having an inwardly extending channel for receiving an annular tire retaining flange. With these as well as other objects in view, the invention resides in the novel features of construction and combinations and arrangements of parts as more fully hereinafter set forth.

In the drawings:—

Figure 1:
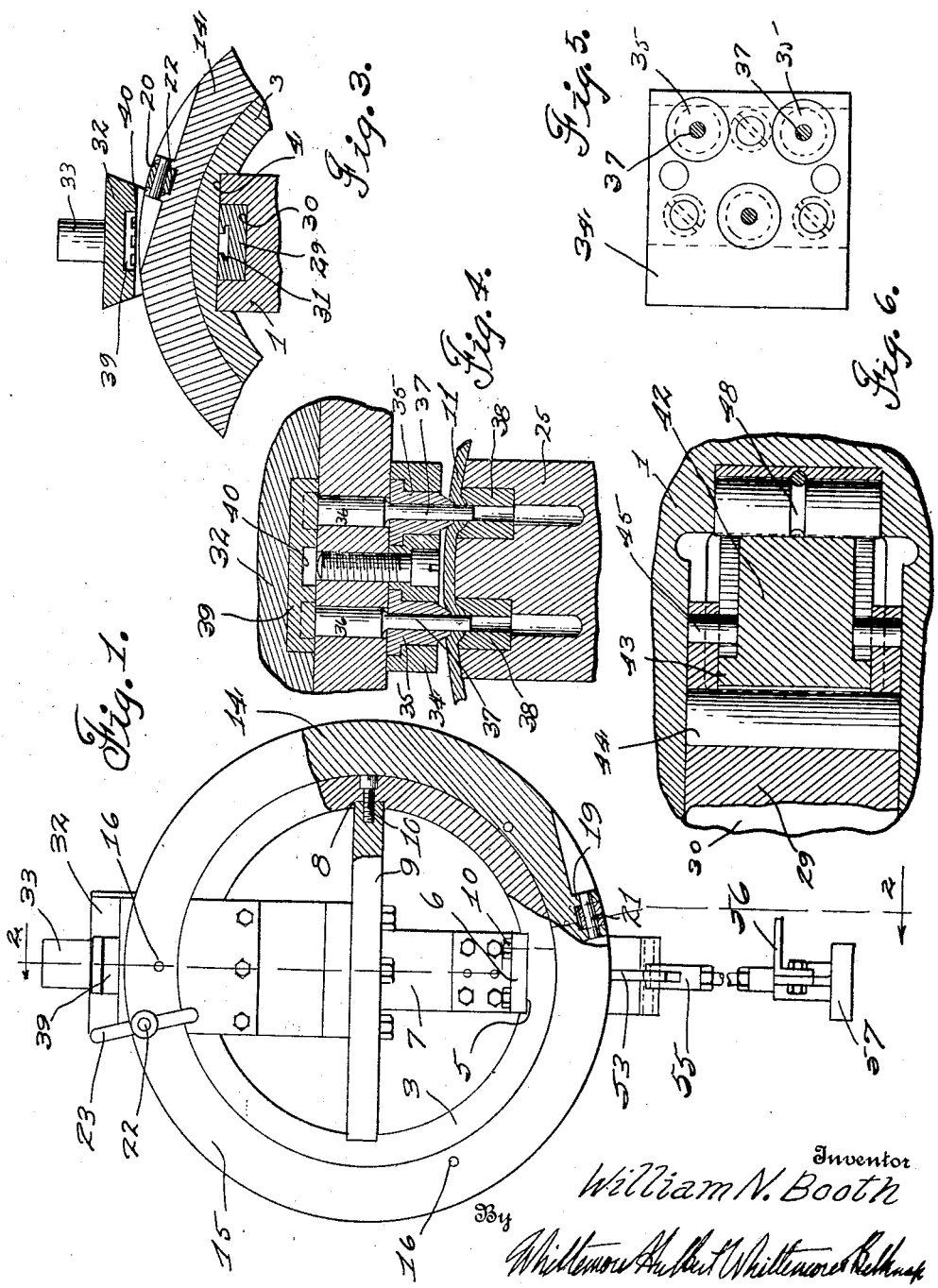
Figure 1 is a front elevation of an apparatus embodying my invention.
Figure 2:
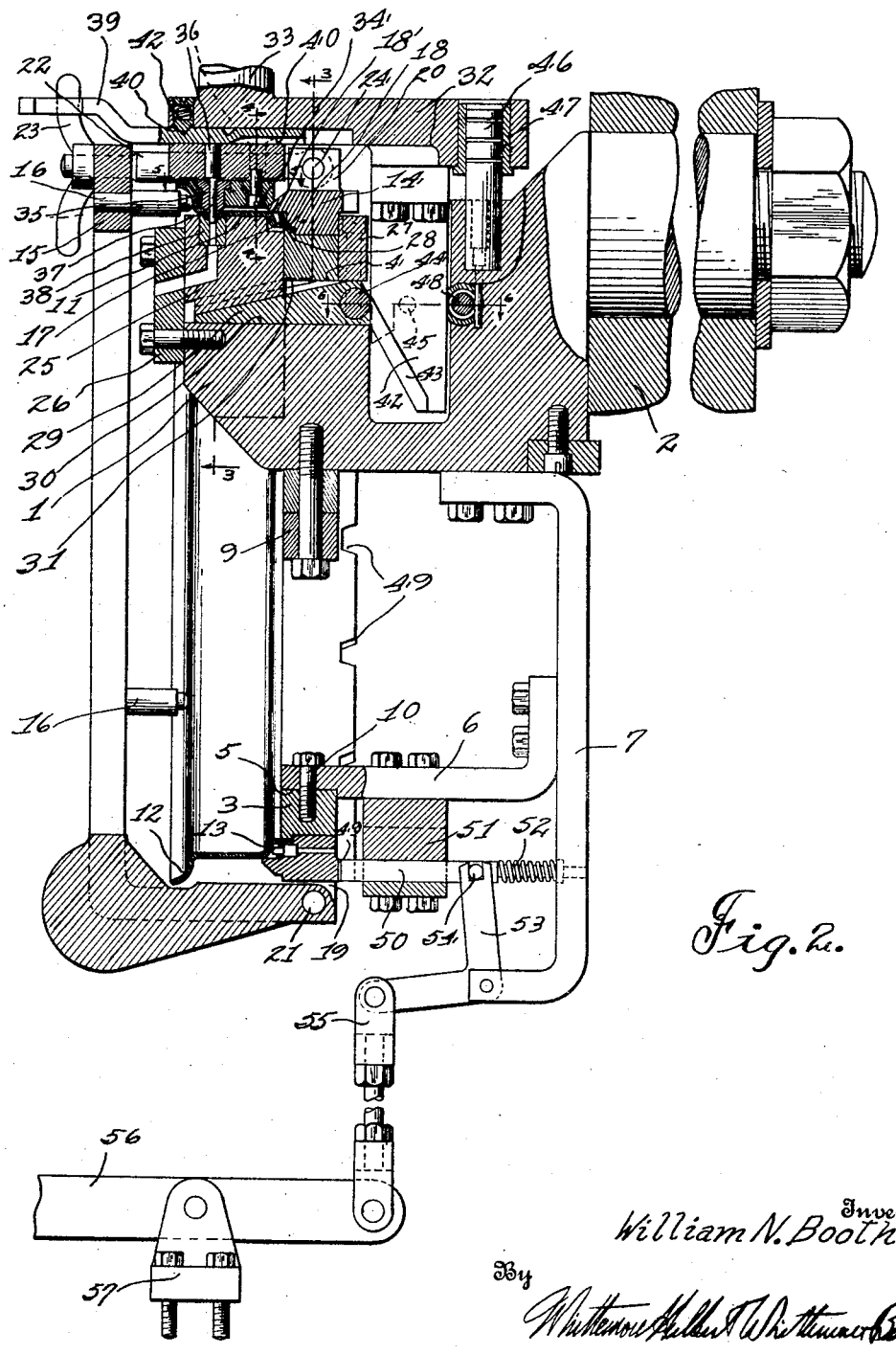
Figure 2 is a cross section on the line 2—2 of Figure 1.

Figures 3, 4, 5 and 6 are cross sections, respectively, on the lines 3—3, 4—4, 5—5 and 6—6 of Figure 2.

The apparatus has the support 1 which is in the nature of a horn fixedly secured to the column 2 of a press. 3 is a bearing ring encircling the support 1 and rigidly secured thereto, this bearing ring having the channel 4 into which the upper portion of the support extends, the diametrically opposite channel 5 engaged by the arm 6 secured to the bracket 7 depending from the support near its rear end and the intermediate channels 8 engaged by the ends of the brace 9 which is rigidly secured to the bottom of the support near its front end. Suitable securing means such as the threaded members 10 firmly secure the ring to the upper portion of the support, to the arm and to the ends of the brace.

The bearing ring 3 supports the means for carrying the rim and permits rotation of this rim carrying means to provide for forming the spoke holes therein. In the present instance the apparatus is designed particularly for forming spoke holes in the base 11 of a continuous or solid base tire carrying rim having at one side the integral tire retaining flange 12 and at the other side the integral channel 13 for detachably receiving a split annular tire retaining flange. For carrying this rim, I have provided the carrying ring 14 encircling the bearing ring 3 and rotatable thereon, the clamp lid 15 and the pins 16. The carrying ring has in its inner front edge the annular rabbet 17 providing the forwardly facing shoulder 18 engageable with the outermost flange of the channel 13 and the inwardly facing shoulder 18' engageable over the channel 13 and with the outer face of the base 11 of the rim. The carrying ring is also provided with the diametrically opposite pair of furcations 19 and 20 which extend radially outward therefrom. The clamp lid 15 is pivotally secured to the bearing ring by the pin 21 between the furcations 19 and is also adapted to be detachably secured to the opposite side of the carrying ring by the clamp screw 22 and the thumb nut 23, the clamp screw being pivotally connected to the furcations 20 by the pin 24. The pins 16 upon the clamp lid extend transversely thereof and their inner ends are adapted to abut the tire retaining flange 12 of the rim and thereby clamp this rim against the carrying ring 14.

25 is a die shoe which is encircled by the rim and vertically movable toward the inner face of its base. The upper inner corner of this die shoe is cut away to provide clearance for the channel 13 of the rim. The inner face of this die shoe bears upon the bearing ring 3 and both the die shoe and bearing ring are held in place by means of the plate 26 bearing against the front face of the die shoe and secured to the support 1 and the block 27 bearing against the rear face of the bearing ring and secured to the support 1. The block 27 also bears against the inner portion of the rear face of the carrying ring 14, while the bearing ring 3 has at its front edge the outwardly extending annular flange 28 for bearing against the inner portion of the front face of the carrying ring whereby the carrying ring and consequently the entire rim carrying means is held in place. For vertically moving the die shoe 25 I have provided the slide 29 which is located in the channel 30 extending longitudinally of the upper portion of the support 1. This slide is located below the bearing ring 3, the die shoe 25 and the block 27 and is movable transversely of the die shoe. The slide is wedge shaped, its front end being of less height than its rear end and is preferably provided with the upwardly and rearwardly inclined guideways 31 in its upper portion for slidably engaging a correspondingly shaped part upon the die shoe.

32 is a holder secured to the vertically reciprocable ram 33 of the press and carrying the punch block 34. Since the apparatus is designed to simultaneously form three spoke holes in the base 11 of the rim, this punch block has rigidly mounted therein the three embossing punches 35 and also carries the three piercing punches 36 having piercing shanks 37 extending axially downward concentrically through the embossing punches. The die shoe 25 has rigidly mounted therein the dies 38 which are located to cooperate with both the embossing and the piercing punches to emboss the base 11 of the rim and pierce the same to form the spoke holes. To control the operation of the piercing punches, I have provided the backing plate 39 which is longitudinally adjustable transversely of the piercing punches 36 and is provided in its under face with the longitudinally extending recesses or grooves 40 adapted to register with the piercing punches and to allow these piercing punches to move upwardly relative to the embossing punches upon downward movement of the holder so that the base of the rim will not be pierced. However, the backing plate 39 may be adjusted inwardly to hold the piercing punches with the lower ends of their piercing shanks below the embossing punches so that the base of the rim will be pierced. For holding the backing plate in its predetermined positions of longitudinal adjustment, the upper face of this backing plate is provided with the recesses 40' which are engageable by the spring pressed plunger 41 carried by the holder 32.

To reciprocate the wedge shaped slide 29, I have provided the cam 42 which is secured to and depends from the holder 32 and has the inclined flange 43, the lower face of which is engageable with the roll 44 carried by the slide and the upper face of which is engageable with the pins 45 carried by and extending transversely of the slide in rear of the roll. The arrangement is such that upon downward movement of the holder the flange 43 contacting with the roll 44 moves the slide 29 forwardly to raise the die shoe 25 and bring the dies 38 into contact with the inner face of the base of the rim. Upon upward movement of the holder the flange 43 contacting with the transverse pins 45 compels them to move transversely relative to the cam and they being connected to the slide return the same thereby lowering the die shoe and its dies.

For guiding the holder 32 during its reciprocation I have provided the pilot 46 upon the support 1 and extending vertically thereabove and slidably engaging the bushing 47 upon the holder 32. For assisting in holding the cam 42 from rearward movement I have provided the roll 48 upon the support 1 and engageable with the rear face of the cam.

To hold the rim in its various correct positions of rotative adjustment so that its base will be properly embossed and pierced, the carrying ring 14 is provided in its rear face with the notches 49 which are engageable by the plunger 50 transversely slidable in the block 51 carried by the arm 6. This plunger is yieldably forced toward the carrying ring by the coil spring 52 sleeved upon the reduced rear end of the plunger and abutting the bracket 7 and the shoulder between the main portion and the reduced end. For disengaging the plunger 50 from the carrying ring to permit rotative adjustment of the ring with the rim there is the bell crank 53 pivotally mounted upon the bracket 7 and having one arm engaging the transverse pin 54 upon the plunger and the other arm pivotally connected to the upper end of the link 55, the lower end of this link being pivotally connected to the foot lever 56 which is pivotally mounted intermediate its ends upon the bracket 57.

In operation and with the rim clamped to its carrying means and held in one of its positions of rotative adjustment by means of the plunger 50 engaging one of the notches 49, the ram 33 of the press is lowered and carries downwardly with it the holder 32 which through the cam 42 and the slide 29 raises the die shoe 25 and its dies 38 into engagement with the base 11 of the rim. Then with the backing plate 39 in its forwardmost position of longitudinal adjustment the embossing dies 35 are lowered to contact with the base 11 of the rim and inwardly emboss the same. Then the ram is raised and the die shoe and its dies lowered through the cam 42 and slide 29. The backing plate 39 may be then longitudinally moved rearwardly and the ram again lowered, at which time the die shoe and its dies are again raised and the piercing punches are then forced downwardly through the base 11 of the rim. However, if desired, it is apparent that both the embossing punches and piercing punches may be operated during the same downward stroke of the ram. After the base of the rim has been embossed and pierced and the ram has returned to its uppermost position the rim may be rotatably adjusted to its next position by disengaging the plunger 50 from the notch 49 and rotating the rim carrying means to bring its next notch into registration with the plunger, at which time the rim is now in position for its base to be embossed and pierced.

What I claim as my invention is:

1. In an apparatus for forming spoke holes in a wire wheel rim, the combination with a support, of means adjustably mounted upon said support for holding the rim upon the latter in a plurality of positions of adjustment, a die upon said support movable outwardly into engagement with the inner face of the base of the rim, a punch movable inwardly into engagement with the base of the rim and adapted to cooperate with said die to pierce the base, and common reciprocatory means for actuating said die and punch.

2. In an apparatus for forming spoke holes in a wire wheel rim, the combination with a support, of means upon and rotatable relative to said support for carrying the rim, cooperating means movable relative to said support and toward the inner and outer faces of the base of the rim for piercing the same, and means engageable with said rim carrying means for holding the same in predetermined positions of rotative adjustment.

3. In an apparatus for forming spoke holes in a wire wheel rim, the combination with a support, of means upon said support for carrying the rim including a rotatable ring, a die engageable with the inner face of the base of the rim, a transversely movable slide for moving said die toward the base, a punch for cooperating with said die to pierce the base and a reciprocatory member for actuating said slide and punch.

4. In an apparatus for forming spoke holes in a wire wheel rim, the combination with a support, of a ring rotatably mounted upon said support and engaging one side of the rim, a clamping member carried by said ring and having portions engaging the other side of the rim at circumferential spaced points to clamp the same against said ring, and means for piercing the base of the rim.

5. In an apparatus for forming spoke holes in a continuous wire wheel rim formed with an opening in one side, the combination with a support, of means for rotatably carrying the rim upon said support including a ring rotatably mounted on said support and engaging one side of the rim, means upon said ring engageable in the side of the rim, means carried by said ring and engaging the other side of the rim to clamp the same against said ring, a die movable outwardly into engagement with the inner face of the base of the rim, and a punch movable inwardly and adapted to cooperate with said die to pierce the base.

6. In an apparatus for forming spoke holes in a wire wheel rim, the combination with a support, of means upon and rotatable relative to said support for carrying the rim, and means for piercing the rim including cooperating members movable toward each other into engagement with the rim.

7. In an apparatus for forming spoke holes in a wire wheel rim, the combination with a support, of means upon and rotatable relative to said support for carrying the rim, a die upon said support movable toward and into engagement with one face of the base of the rim, and a punch movable toward and into engagement with the opposite face of the base and cooperating with said die to pierce the base.

8. In an apparatus for forming spoke holes in a wire wheel rim, the combination with a support, of means upon said support for carrying the rim including a rotatable ring, a die engageable with the inner face of the base of the rim, a member movable transversely of said die for moving the latter toward the base, means for actuating said member, and a punch for cooperating with said die to pierce the base.

9. In an apparatus for forming spoke holes in a wire wheel rim, the combination with a support, of a ring rotatably mounted on said support and engaging one side of the rim, a member pivotally connected to said ring and provided with means for engaging the other side of the rim to clamp the same against said ring, and means for piercing the base of the rim.

10. In an apparatus for forming spoke holes in a wire wheel rim, the combination with a support, of a ring rotatably mounted upon said support and engaging one side of the rim and provided with peripherally spaced notches, means for clamping the rim against said ring including a member pivotally connected to said ring and rotatable therewith, means engageable with the notches for holding the ring in predetermined positions of rotative adjustment, and means for piercing the rim.

11. In an apparatus for forming spoke holes in a wire wheel rim, the combination with a support, of a ring rotatably mounted on said support and engaging one side portion of the rim, a member pivotally connected to said ring and provided with means for engaging an opposite side portion of the rim to clamp the latter against the ring, and means for piercing the rim.

In testimony whereof I affix my signature.

WILLIAM N. BOOTH.